(12) United States Patent
Swain et al.

(10) Patent No.: US 7,992,948 B2
(45) Date of Patent: Aug. 9, 2011

(54) HYDRAULIC REGENERATIVE BRAKING FOR A VEHICLE

(75) Inventors: David M. Swain, Ann Arbor, MI (US); Jason Z. Moore, Orion, MI (US); Frank C. Maurer, Skokie, IL (US); Albert Shih, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 654 days.

(21) Appl. No.: 11/567,829

(22) Filed: Dec. 7, 2006

(65) Prior Publication Data

US 2007/0126284 A1 Jun. 7, 2007

Related U.S. Application Data

(60) Provisional application No. 60/748,078, filed on Dec. 7, 2005.

(51) Int. Cl.
*B60T 8/64* (2006.01)
(52) U.S. Cl. .................................. 303/152; 188/24.26
(58) Field of Classification Search .................. 303/152, 303/137; 180/205; 188/24.11, 24.14, 24.22, 188/24.26, 106 F, 106 A, 344
See application file for complete search history.

(56) References Cited

U.S. PATENT DOCUMENTS

| | | | |
|---|---|---|---|
| 269,547 A | 12/1882 | Starr | |
| 780,598 A | 1/1905 | Coleman et al. | |
| 1,763,183 A * | 6/1930 | Roe | 280/296 |
| 3,056,567 A * | 10/1962 | Smith et al. | 244/103 S |
| 3,850,448 A | 11/1974 | Stewart | |
| 3,903,696 A * | 9/1975 | Carman | 60/414 |
| 4,087,105 A | 5/1978 | Amarantos | |
| 4,108,459 A | 8/1978 | Alvigini | |
| 4,139,422 A | 2/1979 | Kolosov et al. | |
| 4,270,806 A | 6/1981 | Venkataperumal et al. | |
| 4,335,494 A | 6/1982 | Lemelson | |
| 4,663,935 A | 5/1987 | Rohde | |
| 4,753,078 A | 6/1988 | Gardner, Jr. | |
| 4,763,751 A | 8/1988 | Gardner, Jr. | |
| 4,942,936 A | 7/1990 | Gardner, Jr. | |
| 4,986,383 A | 1/1991 | Evans | |
| 5,082,093 A | 1/1992 | Sule | |
| 5,199,857 A | 4/1993 | Sanuki | |
| 5,263,401 A | 11/1993 | Walker | |
| 5,323,688 A | 6/1994 | Walker | |
| 5,378,053 A | 1/1995 | Patient et al. | |
| 5,570,286 A | 10/1996 | Margolis et al. | |

(Continued)

OTHER PUBLICATIONS

International Search Report PCT/US 2006/46791; from Patent Cooperation Treaty Oct. 22, 2007; 12 pages.

*Primary Examiner* — Xuan Lan Nguyen
(74) *Attorney, Agent, or Firm* — Howard & Howard Attorneys PLLC

(57) ABSTRACT

A regenerative brake of the present invention presents a hydraulic device disposed in a front hub of a bicycle wheel. The device allows the bicycle to recapture part of the kinetic energy that would otherwise be lost when braking and make use of that power either by storing it for future use or feeding it back into a power system to be used. The hydraulic device may also be stored in a rear hub of the bicycle wheel.

22 Claims, 13 Drawing Sheets

U.S. PATENT DOCUMENTS

| | | |
|---|---|---|
| 5,603,553 A | 2/1997 | Klieber et al. |
| 5,637,987 A | 6/1997 | Fattie et al. |
| 5,772,225 A | 6/1998 | Brackett |
| 5,799,562 A | 9/1998 | Weinberg |
| 5,813,501 A | 9/1998 | Terry, Sr. |
| 5,857,755 A | 1/1999 | Aoki et al. |
| 5,938,224 A | 8/1999 | Brackett |
| 6,006,850 A | 12/1999 | Yu |
| 6,032,968 A | 3/2000 | Chattin |
| 6,068,351 A | 5/2000 | Martin-Gerez |
| 6,231,134 B1 | 5/2001 | Fukasawa et al. |
| 6,748,737 B2 | 6/2004 | Lafferty |
| 6,971,467 B2 * | 12/2005 | Katsaros .................. 180/205 |
| 2007/0284177 A1 * | 12/2007 | Mann ....................... 180/306 |
| 2008/0169700 A1 * | 7/2008 | Poss ........................... 303/10 |

\* cited by examiner

HYDRAULIC REGENERATIVE BRAKING FOR A VEHICLE

RELATED APPLICATION

The application claims priority to U.S. Provisional Patent Application Ser. No. 60/748,078 filed Dec. 7, 2005, which is incorporated herein by reference in its entirety.

A STATEMENT REGARDING FEDERALLY SPONSORED RESEARCH OR DEVELOPMENT

This invention was made with government support under grant number XA-83194901-0 awarded by U.S. Environmental Protection Agency/ATD. The government has certain rights in the invention.

FIELD OF THE INVENTION

The present invention relates to a regenerative braking device or system which allows a vehicle, such as, for example, a bicycle, to recapture part of the kinetic energy that would otherwise be lost when braking and make use of the recaptured energy to assist take-off and hill climb maneuvers.

BACKGROUND OF THE INVENTION

Today, due to the lack in availability of petroleum oils, the trend towards Alternate Fueled Vehicles (AFV's), hybrid vehicles, and human powered vehicles (HPV's) has been the focus of many automakers, scientists, and inventors. Most of the automobile manufacturers are venturing into the area of the hybrid vehicles which utilize electric power in combination with the typical internal combustion engine. These hybrid vehicles present several drawbacks. First, these hybrid vehicles require heavy duty batteries to produce power. These batteries are heavy and require frequent charging, which limits the longetivity and feasibility of these vehicles.

Alluding to the above, a bicycle is another form of AFV's. Various bicycle configurations have been proposed to enhance the nexus between human power and kinetic energy. For example, numerous prior art patents have been proposed in which a hydraulic brake/transmission is incorporated into a bicycle, or for example electric/hydraulic motor vehicle braking is provided to create regenerative energy storage for conversion into kinetic energy.

In a standard bicycle setup, braking traditionally operates on the principle of a clamping caliper with opposing pads frictionally engaging the rotating wheel rim to convert the kinetic energy of the bicycle into heat through the mechanism of friction. Thus, valuable kinetic energy is thrown away as lost heat during braking. The goal of the regenerative hydraulic braking bicycle project is to reduce the amount of energy required from the rider to accelerate the bike to 20 mph. When the rider engages the regeneration cycle for deceleration during braking, a hydraulic pump directs fluid to a nitrogen-filled accumulating tank and stores energy in the form of pressurized nitrogen in the accumulating tank. When the rider wants to accelerate again, he/she runs the launch cycle, which uses a hydraulic motor to release the pressure in the tank and convert the stored energy to torque on the front wheel of the bicycle. Ideally, the pressure stored in the tank will provide enough energy to return the bike to its original speed before the regeneration cycle. In addition, past bicycles have only utilized a single option for braking during the regeneration cycle.

The U.S. Pat. No. 4,087,105 to Amarantos, for example, suggests the use of a hydraulic system to replace sprockets and a chain in a bicycle, and which provides a secondary ability to store braking energy for later use in an accelerated launch. This system is installed on a back wheel of the bicycle and the entire bicycle is built around this hydraulic system. The accumulator and low side reservoir are located in the frame of the bicycle itself. The U.S. Pat. No. 4,087,105 to Amarantos uses two pumps and no chain. Propulsion must be carried out entirely by the hydraulic system. A first hydraulic pump is attached to the pedal crank, so that as the rider pedals, he or she effectively turns the pump. Fluid flows to the hydraulic motor on the rear wheels and turns the wheel in lieu of a chain. When stopping or going down hill, a valve can be switched to allow fluid to flow into an accumulator and increase in pressure, because the motor is free spinning. The second pump is activated by the rider pumping on a handlebar in an up-and-down motion. This causes pressure in the accumulator to increase. Braking is accomplished by stopping the fluid flow from the motor to the reservoir. As the fluid flow is cut off, the back pressure increases thus stopping the fluid and locking the rotation of the motor.

The U.S. Pat. No. 4,087,105 to Amarantos's proposal is deficient in numerous respects. First, the system relies upon the hydraulic system and the rider's pedaling input to move the bike forward. Thus, the energy losses inherent in the pump and the motor will result in significant over-exertion. Second, restricting the fluid flow out of the pump/motor may vary the braking, but will not vary the amount of energy regenerated. Thus, it would be a misnomer to suggest the system disclosed in the U.S. Pat. No. 4,087,105 to Amarantos actually achieves variable regenerative braking. Furthermore, this system requires a specially designed bicycle, and is not capable of retro-fit installation in an existing bicycle. Also, a 0-20 mph acceleration for 220 pounds required nearly 5000 Joules of energy storage, and using the standard 4000 psi pumps, the fluid volume proposed in the U.S. Pat. No. 4,087,105 to Amarantos is severely underestimated.

Another example of a prior art system is taught by the U.S. Pat. No. 4,942,936 to Gardner, which describes a bicycle capable of running off either compressed air or hydraulic fluid from a pump powered by an electric motor. The bicycle has the typical chain and sprocket assembly to function as a normal bicycle when needed. The bicycle has regenerative braking accomplished by a generator that continuously puts energy back into a battery, which in turn is used to operate the hydraulic motor. This concept is deficient in that the hydraulic (or pneumatic) system does not directly generate the energy. Rather, the electric generator supplies energy to the battery which in turn powers the motor that drives the pump. Not only do these additional components increase system complexity, weight and cost, but the numerous energy conversions introduce losses which are proportionally significant in a bicycle application. Furthermore, this prior art design places propulsion units at both wheels, thereby further increasing the weight of the bicycle system. Also, to achieve a mildly aggressive braking at 20 mph of 4 m/s$^2$ deceleration, an electric motor greater than 4 hp would be required. The added weight of a 4 hp efficient electric motor would make it an unacceptable solution for a bicycle.

Other examples of prior art systems may include hydraulic bicycle brakes and transmissions, such as those depicted in the U.S. Pat. Nos. 5,938,224 and 5,772,225. These devices provide an interesting way to transmit power to the wheels instead of using a chain, but provide no capability for energy storage. In addition, the U.S. Pat. No. 6,032,968 discloses a hydraulic transmission for a bicycle. Other examples of hydraulic powered bicycle brakes may be found in the U.S. Pat. Nos. 5,813,501 and 5,082,093. Examples of hydraulic regenerative braking may be found in numerous motor vehicle examples in which the braking energy is converted into electricity. This can be done with either direct connection to the vehicle brake system through a mechanical interchange, or via a hydraulic pump mounted at each wheel.

But even, if it is practicable, it would be desirable to provide an improved regenerative braking system for a vehicle, such as, for example, a bicycle, and the like, configured to recapture part of the kinetic energy that would otherwise be lost when braking and make use of that power released to assist take-off and hill climb maneuvers of the bicycle.

As such, the Applicant's inventive concept is aimed to solve one or more problems associated with the prior art designs.

SUMMARY OF THE INVENTION

The present invention relates a regenerative braking system having a wheel assembly, which allows a vehicle, such as, for example, a bicycle, to recapture part of the kinetic energy that would otherwise be lost when braking and make use of that energy to assist take-off and hill climb maneuvers. The regenerative braking wheel assembly includes a frame having a front axle and a rear axle. A front wheel is rotatably supported by the front axle and a rear wheel is rotatable supported by the rear axle. Each wheel has a rim and a tire supported by the rim. A pair of wheel hubs are connected to the rim of the front wheel thereby rigidly supporting the rim about the circumference of the rim. Each of the wheel hubs presents a dish having a concave configuration defining a bottom, a peripheral wall extending into a peripheral lip connected to the rim. Each dish is formed from at least one of polymeric material, fiberglass material, and metal and metal alloys without limiting the scope of the present invention.

A support ring is connected to the bottom of one of the dishes. A ring gear is rigidly connected to the support ring and extends to peripheral teeth. The ring gear and the support ring are rotatable with the rim about the front axle.

A braking mechanism includes a first housing, i.e., first/low-side accumulator, for storing a first fluid and a second housing, i.e., second/high-side accumulator, for storing a second fluid different from the first fluid. The first and second housings are disposed in the rim and meshingly engaged with the ring gear with the first and second housings fluidly communicating with one another. A pump is connected to the first housing and is meshingly engaged with the ring gear thereby activating the pump as the wheel is rotated about the front axis. A motor is connected to the second housing and is meshingly engaged with the ring gear. The motor is activated in an accelerating mode as the braking energy fluidly biased out from the second housing forces the motor to rotate the ring gear meshingly engaged with the motor about the front axis. The pump and the motor include at least one secondary gear meshingly engaged with the ring gear. Preferably, the pump and the motor are hydraulic pump and hydraulic motor. The pump provides braking and the motor provides acceleration, both connected to the same low-side reservoir, i.e the first housing, and a high-side accumulator, i.e. the second housing. The pump is larger than the motor so that when both the pump and the motor are simultaneously actuated, the difference provides a smaller (light) pumping/braking torque than when using the pump alone. The pump is optionally clutched out in mechanical or electrical fashion. This concept can be expanded by using multiple pumps or motors of different sizes, however, on a bicycle this two-stage braking is marginally sufficient.

A first valve and a second valve fluidly communicate with the first and second housings, the pump and the motor. The first and second valves are manually or electrically activated to regulate the braking mode and the accelerating mode of the braking mechanism. A fluid communication system of the present invention includes and is not limited to a first line extending from the first housing through the pump and to the first valve for delivering the first fluid to the first valve, a second line extending from the first valve to the second housing for injecting the first fluid to the second housing thereby biasing the piston separating the first fluid from the second fluid. The fluid communication system further includes a third line extending from the second housing to the second valve for delivering the first fluid back to the second valve as the first fluid is biased out from the second housing by the piston in the accelerating mode, a fourth line extending from the second valve to the motor thereby activating the motor in the accelerating mode, and a fifth line extending from the motor back to the first housing for delivering the first fluid back to the first housing before the first fluid is re-circulated back from the first housing to the pump through the first line. In addition, the pump and/or motor may be intermittently actuated by the valves to reduce the braking force or enhance acceleration. A support bracket is rigidly connected to the first and second housings, the first and second valves, the motor and the pump. The support bracket is rigidly connected to the front axle as the rim rotates relative the front axle.

The braking mechanism of the present invention is selectively operable between the braking mode as the first fluid from the first housing is transferred to the second housing through the first line thereby biasing the piston in the second housing to recapture and store the braking energy and the accelerating mode as the first fluid is biased out from the second housing through the fourth line extending from the second valve to the motor to activate the motor in the accelerating mode thereby accelerating the rotation of the rim meshingly engaged with the motor.

The braking system may also incorporate two motors to achieve launch and variable braking. One motor is used in "launch" while the other motor is used in reverse as the pump is in "regen", wherein the "launch" refer to the high-side pressure being released and fueling the motor to accelerate the bicycle and the "regen" is used to describe the motor forcing the hydraulic fluid to the high-side thereby creating a pressure induced braking torque on the wheel. The regen motor has the same flow capacity (the fluid displacement per revolution) as the launch motor, but the regen motor has a gear ratio (regen gear: drive gear) that is twice that of the launch gear ratio. As such, the bicycle's magnitude of deceleration is greater than that of its acceleration and the bicycle slows down. In addition, running the two motors simultaneously with one in regeneration and one in launch mode provides a second, lesser braking torque. Alternatively, the motor is connected to a one-way roller bearing clutch.

An advantage of the present invention is to provide a multi-stage or variable regenerative braking system for a vehicle, such as a bicycle, adaptable to store the energy for a 20 mph down to zero braking/deceleration and later release the energy for acceleration from 5-18 mph without pedal assistance (or 0-20 mph with minimal pedal assistance).

Another advantage of the present invention is to provide a regenerative braking system for a bicycle using a hydraulic mechanism disposed in and supported by the front wheel of the bicycle thereby improving compactness of the bicycle.

Still another advantage of the present invention is to provide to a rim designed to house two motors, a gear train, two accumulators or housings, two-way and/or three-way valves, and a hydraulic pumping system with all of these components being enclosed by side covers or wheel hubs formed from carbon-fiber to minimize the frontal weight of the bicycle.

Still another advantage of the present invention is to provide a regenerative braking system adaptable to provide variable braking for the bicycle in the form of two levels of braking torque accomplished by using two hydraulic motors.

Still another advantage of the present invention is to provide a two-wheel drive during acceleration while biking in the sand.

BRIEF DESCRIPTION OF THE DRAWINGS

These and other features and advantages of the present invention will become more readily appreciated as the same becomes better understood by reference to the following detailed description when considered in connection with the accompanying drawings, wherein.

DETAILED DESCRIPTION OF THE INVENTION

The present invention relates a regenerative braking device or system which allows a vehicle, such as, for example, a bicycle, to recapture part of the kinetic energy that would otherwise be lost when braking and make use of that energy released to assist take-off and hill climb maneuvers. The present invention is applicable to automobiles and other vehicles with the bicycle used for exemplary purposes without limiting the scope of the present invention.

Figure 1:
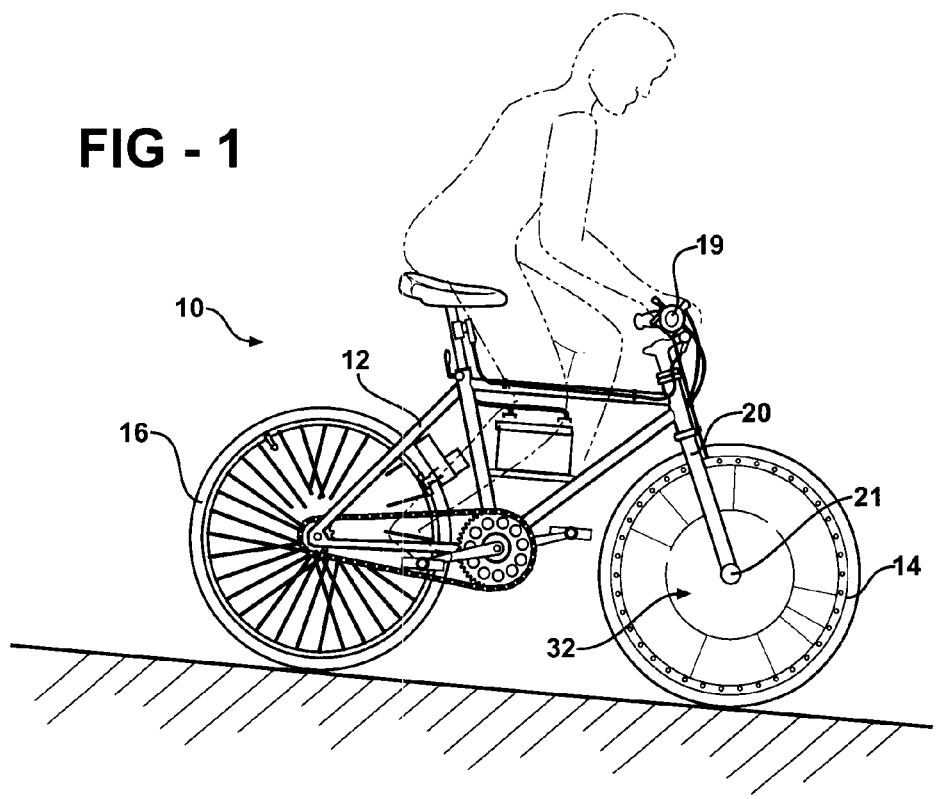
FIG. 1 is an exemplary view of a bicycle and a rider traveling in a down-hill direction.
Figure 2:
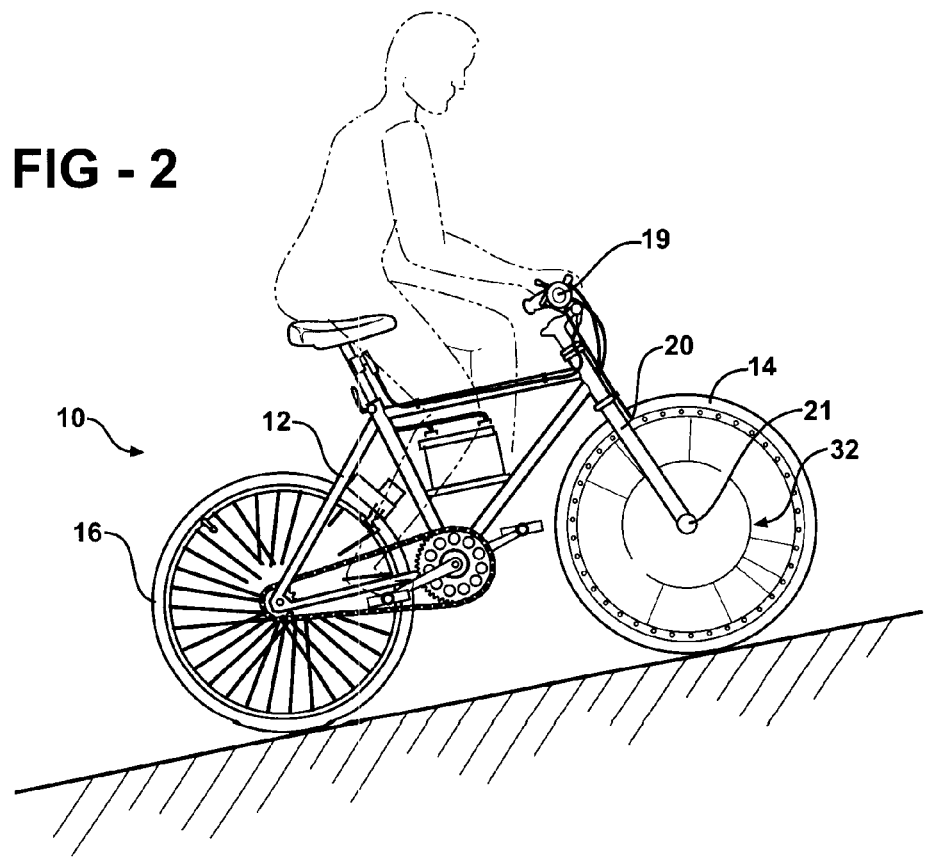
FIG. 2 is an exemplary view of the rider and the bicycle traveling in an up-hill direction.
Figure 3:
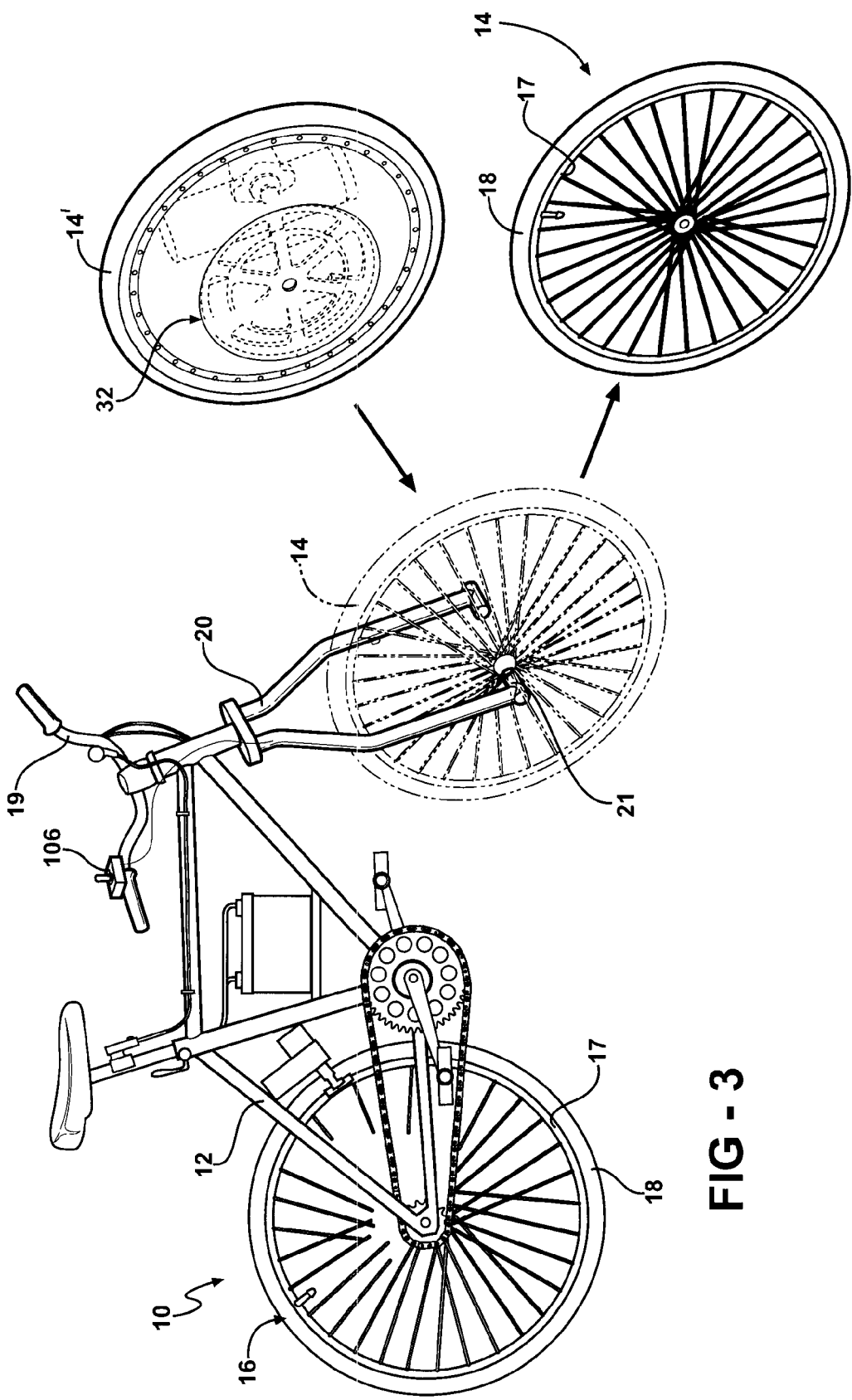
FIG. 3 is a simplified view illustrating a wheel incorporating the subject two-stage hydraulic regenerative braking invention being retrofitted on an existing bicycle by replacement of its traditional front wheel.

Referring to the Figures, wherein like numerals indicate like or corresponding parts throughout the several views, a bicycle is generally shown at 10 in FIGS. 1 through 3. The bicycle 10 has a frame 12 rotatably supporting front 14 and rear 16 wheels, with each wheel 14 and 16 having a rim 17 and a tire 18. The front wheel 14 is steerable by way of a handlebar 19 joined to fork tubes 20 holding the axle 21 of the front wheel 14. FIG. 1 illustrates a rider on the bicycle 10 descending a slope, which is merely representative of a condition in which the kinetic energy of the bicycle must be reduced through a braking operation. Traditionally, this is accomplished by clamping brake pads (not shown) against rims 17 of the front 14 and/or rear 16 wheels, thereby converting the kinetic energy into lost heat through the mechanism of friction.

FIG. 2 illustrates an example of the rider upon the bicycle 10 ascending an incline. During such conditions, the rider must invest additional energy in the bicycle 10 as work in order to accelerate the speed of the bicycle 10. The same is true in almost any launch situation, even on level ground, in which the rider must invest energy to accelerate from a stopped or low speed condition. At such times, it would be beneficial to have stored the energy lost during a previous braking operation and to reintroduce that energy at a time selected to help propel the bicycle 10 forward. For example, if the rider needs to quickly cross a lane of traffic it may be helpful to receive a supplemental burst of energy to boost acceleration.

Figure 4:
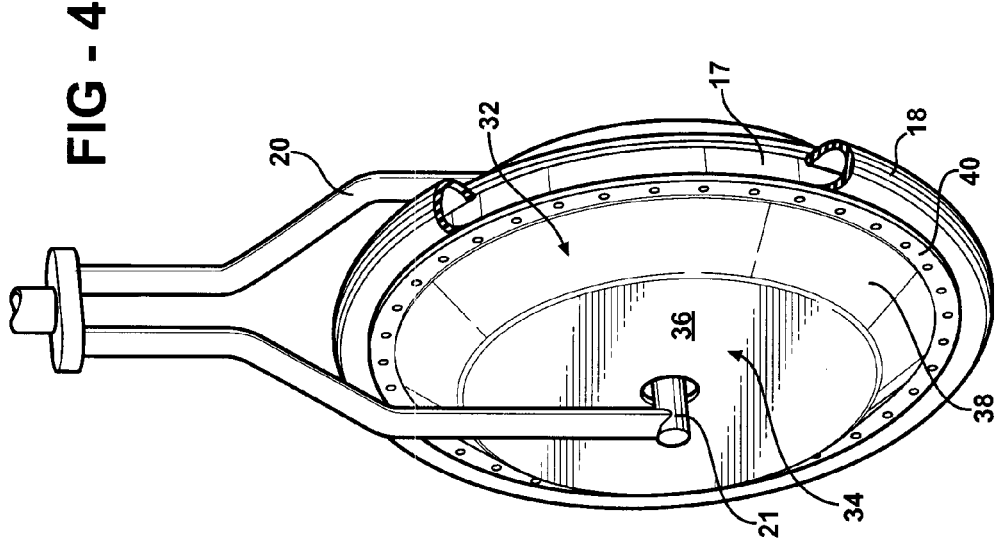
FIG. 4 illustrates a rim of the present invention and a tire disposed on the rim.
Figure 7:
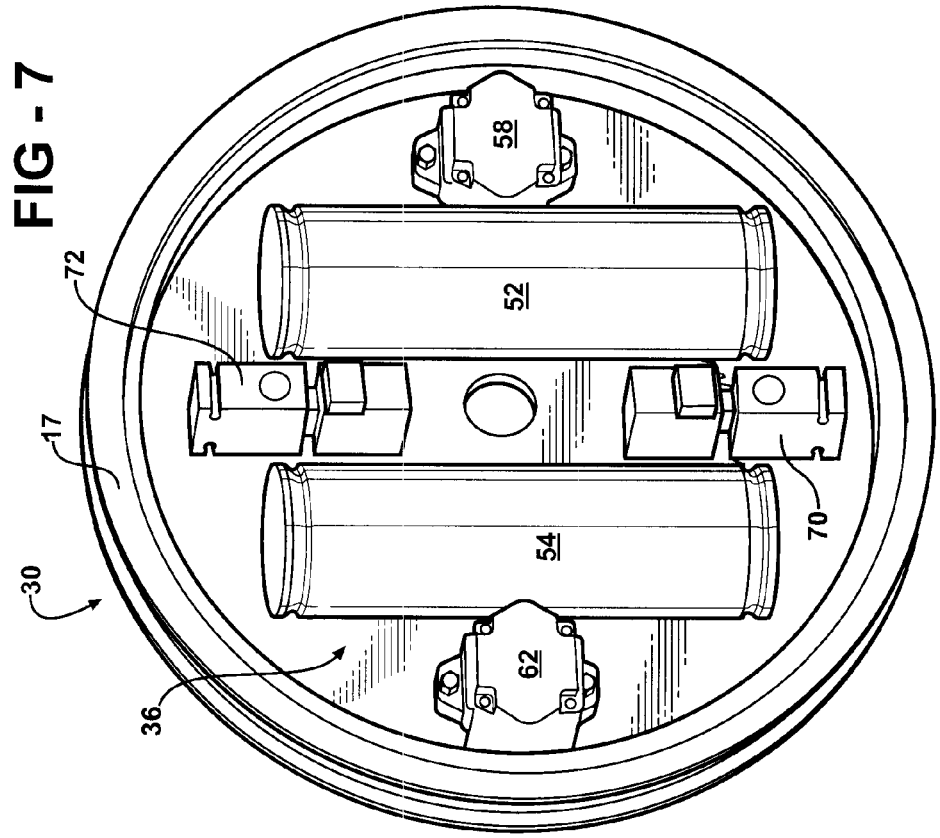
FIG. 7 shown a first housing, a second housing, the motor, the pump, and a pair of multi-way valves disposed within the rim.
Figure 6:
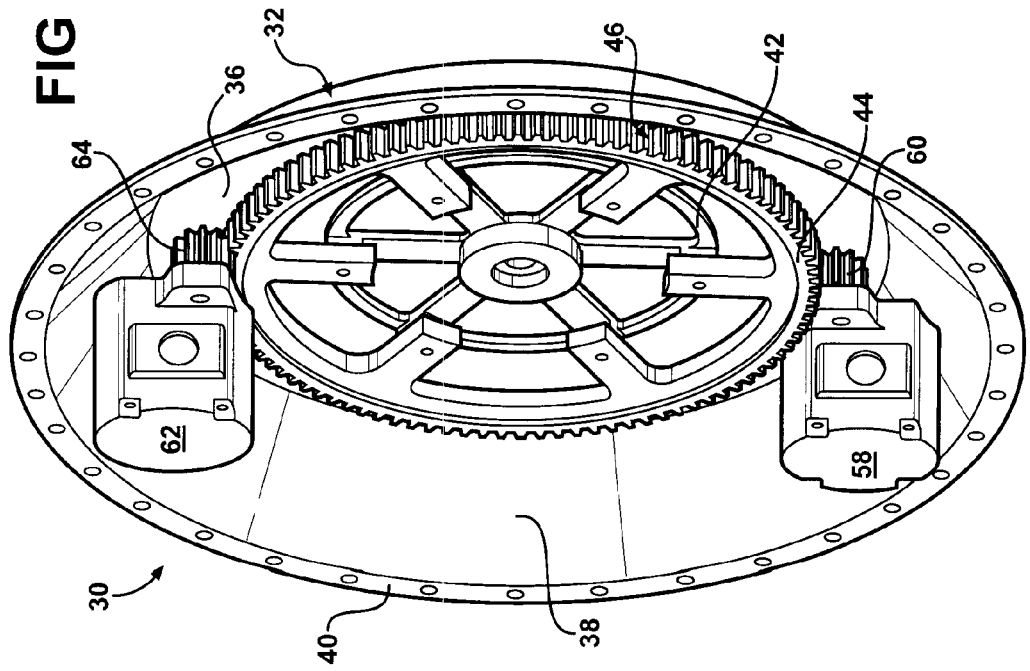
FIG. 6 illustrates a dish of a cover member having the support ring connected to the bottom of the dish and the ring gear rigidly connected to the ring gear with the ring gear meshigly engaged with a motor and a pump.
Figure 8:
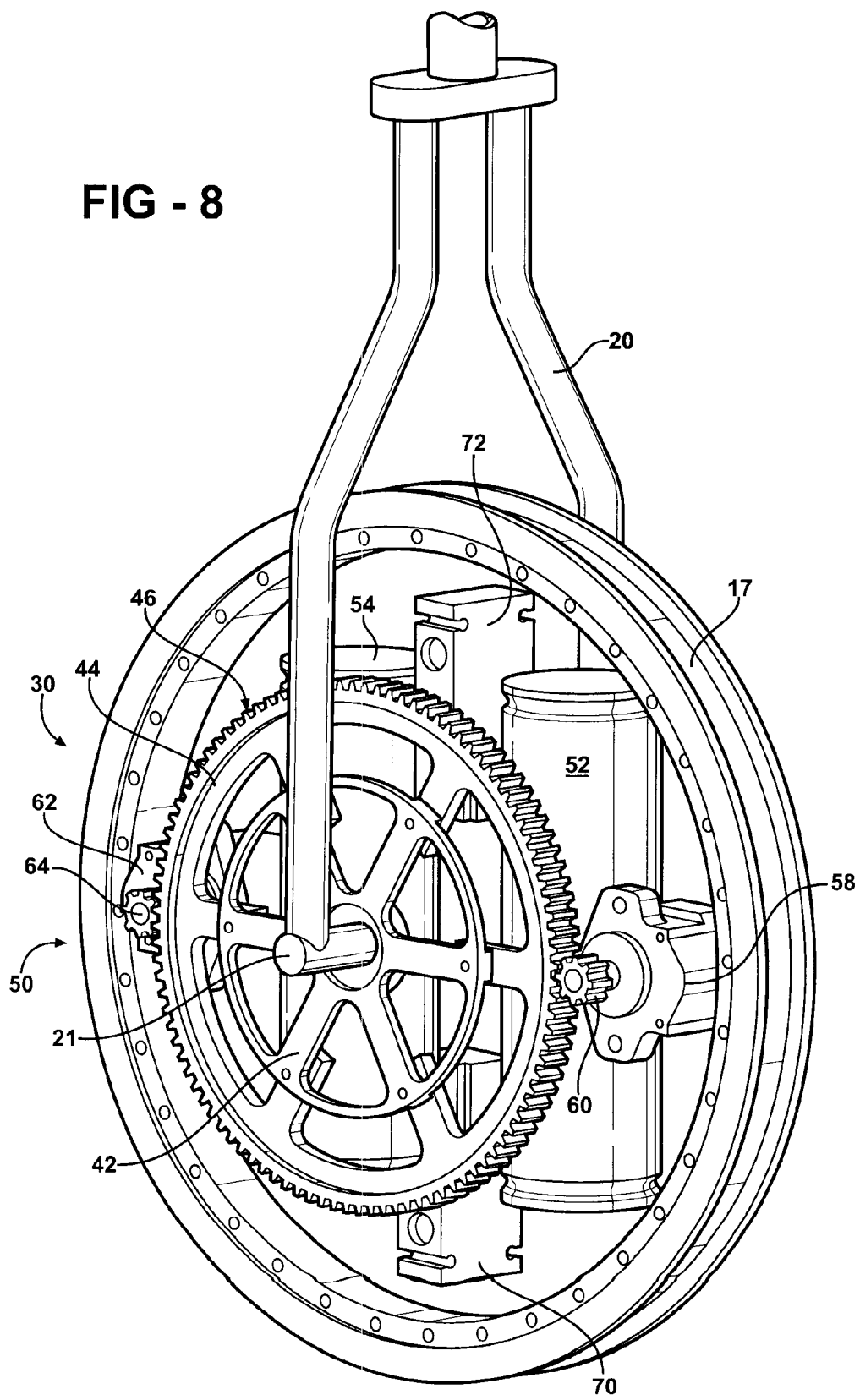
FIG. 8 is a perspective view showing the subject two-stage hydraulic regenerative braking system incorporated into the hub of a bicycle front wheel.

Referring now to FIGS. 3, 4, 6 through 9, a regenerative braking wheel assembly (the assembly) of the present invention is generally shown at 30. The assembly 30 is housed in the rim 17 of the front wheel 14'. Alternatively, the assembly may be housed in the rim 17 of the rear wheel 16. A pair of wheel hubs or covers, generally indicated at 32 in FIGS. 3 and 4, are removably connected to the rim 17 of the front wheel 14' thereby rigidly supporting the rim 17 about the circumference of the rim 17. As best shown in FIG. 6, each spiking member 32 presents a dish, generally indicated at 34, having a concave configuration defining a bottom 36, a peripheral wall 38 extending into a peripheral lip 40 connected to the rim 17. Each dish 34 may be formed from at least one of polymeric material, fiberglass material, and metal and metal alloys, without limiting the scope of the present invention. The wheel assembly can be readily retro-fit on an existing bicycle 10 by simply replacing the old front wheel 14 with the inventive front wheel 14'. It is anticipated that the previous caliper style brakes can be reused along with the prior forks 20 and other main components.

Figure 5:
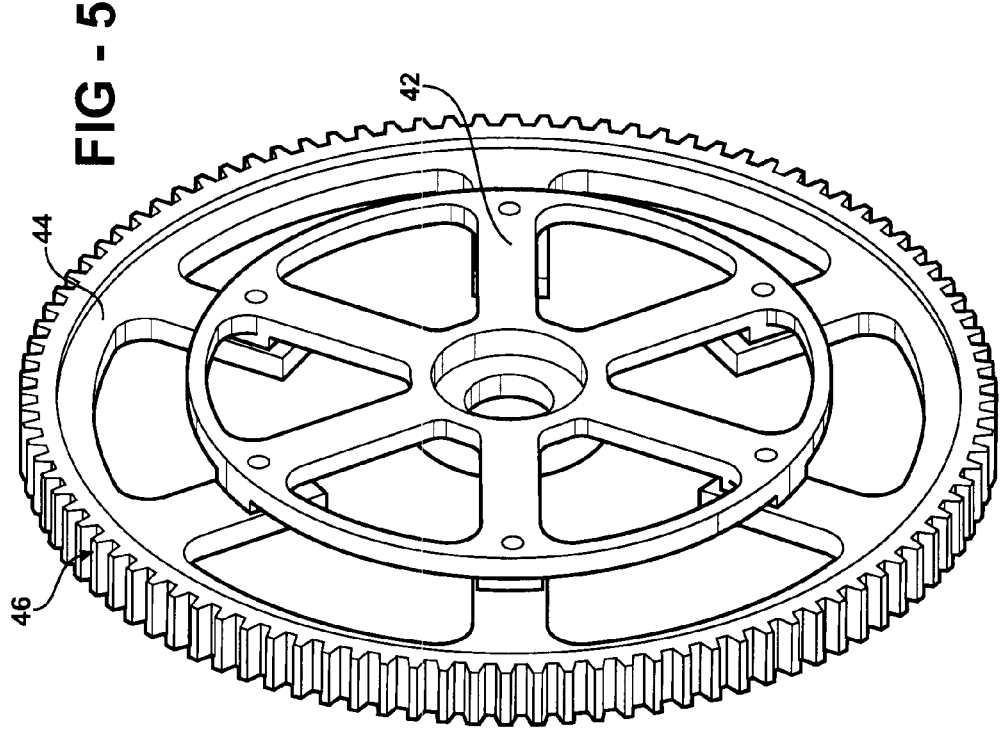
FIG. 5 shows a perspective view of a support ring and a ring gear of the rim.

As best illustrated in FIGS. 5 and 6, a support ring 42 is connected to the bottom 36 of one of the dishes 34. A ring gear 44 is rigidly connected to the support ring 42 and extends to peripheral teeth, generally indicated at 46. The ring gear 44 and the support ring 42 are rotatable with the rim 17 about the front axle 21. A braking mechanism, generally shown at 50 in FIGS. 8 through 12 is used to resist rotational movement of the front wheel 14' relative the axle 21. A first housing 52 or accumulator of the braking mechanism 50 stores a first fluid or hydraulic fluid, such as, for example Dextrin III, Biodiesel, a glycerin-water mixture, ant the like without limiting the scope of the present invention. A second housing 54 or accumulator of the braking mechanism 50 stores a second fluid, such as, for example, Argon, Nitrogen. Alternatively, other mechanical devices may be used instead of the second fluid to provide a biasing force.

Figure 10:
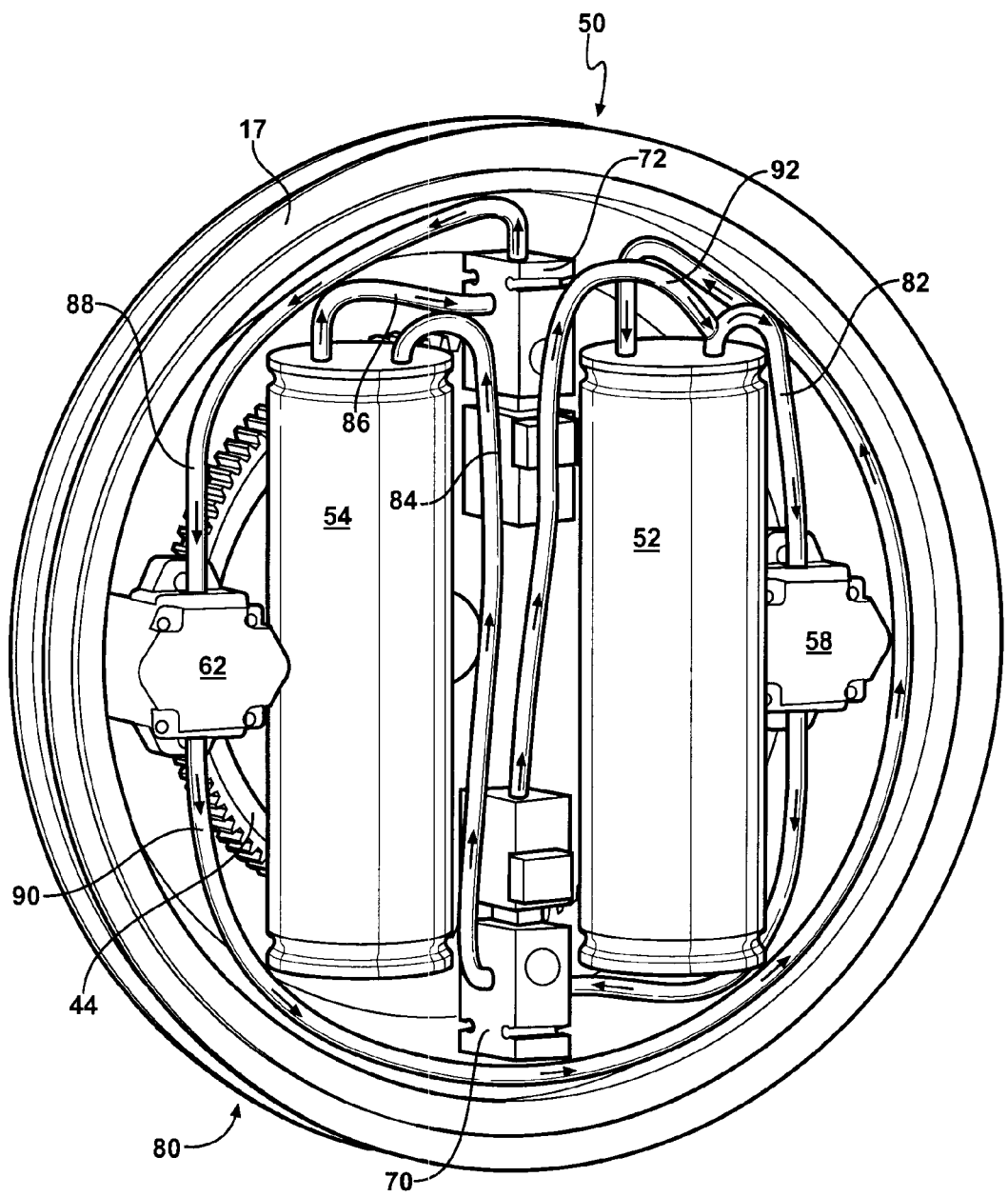
FIG. 10 illustrates the components of the subject two-stage hydraulic regenerative braking system as shown in FIG. 7 fluidly connecting with one another.
Figure 11:
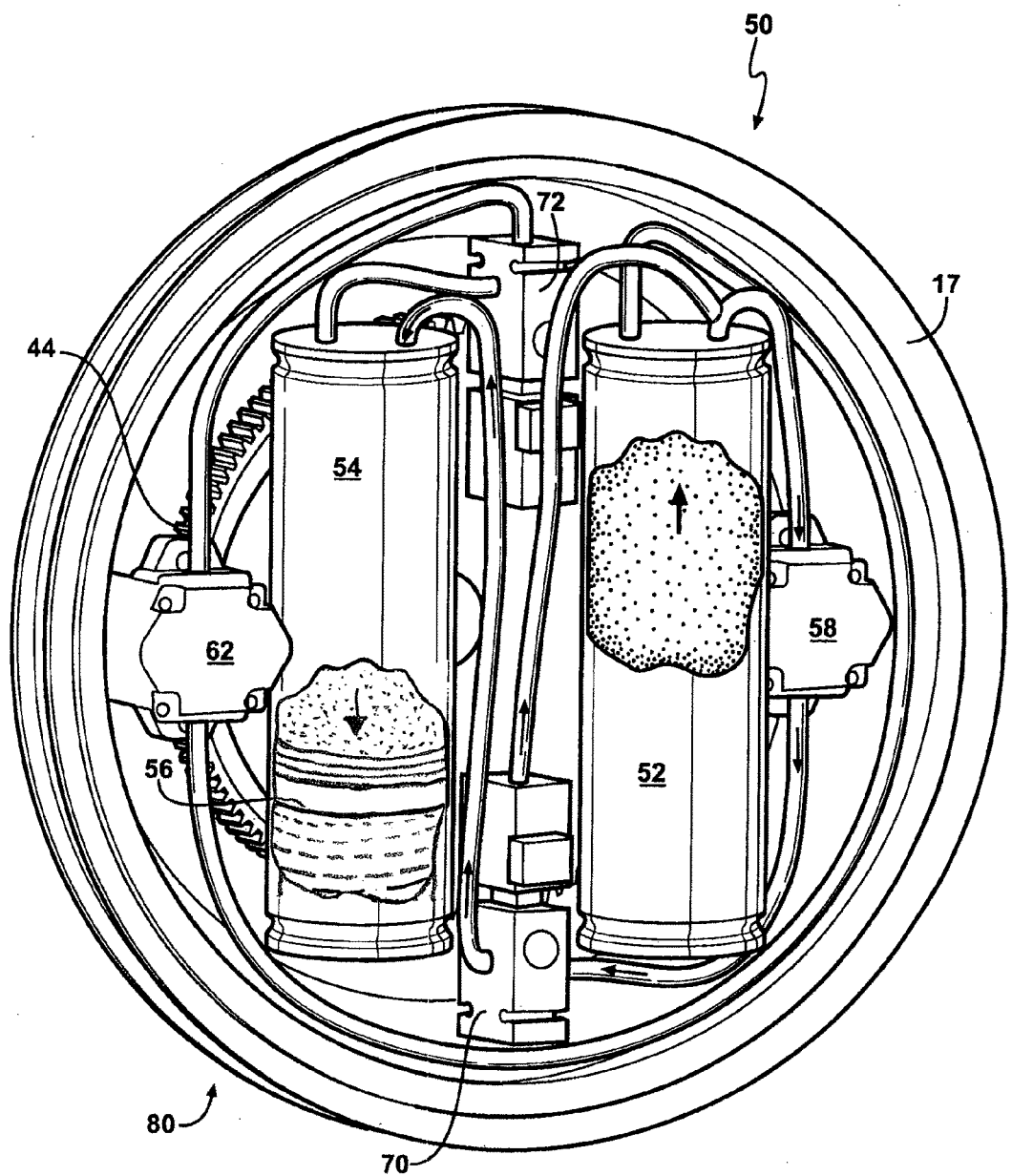
FIG. 11 shows the components of the subject two-stage hydraulic regenerative braking system as shown in FIG. 10 presented in a braking mode of the braking system.
Figure 12:
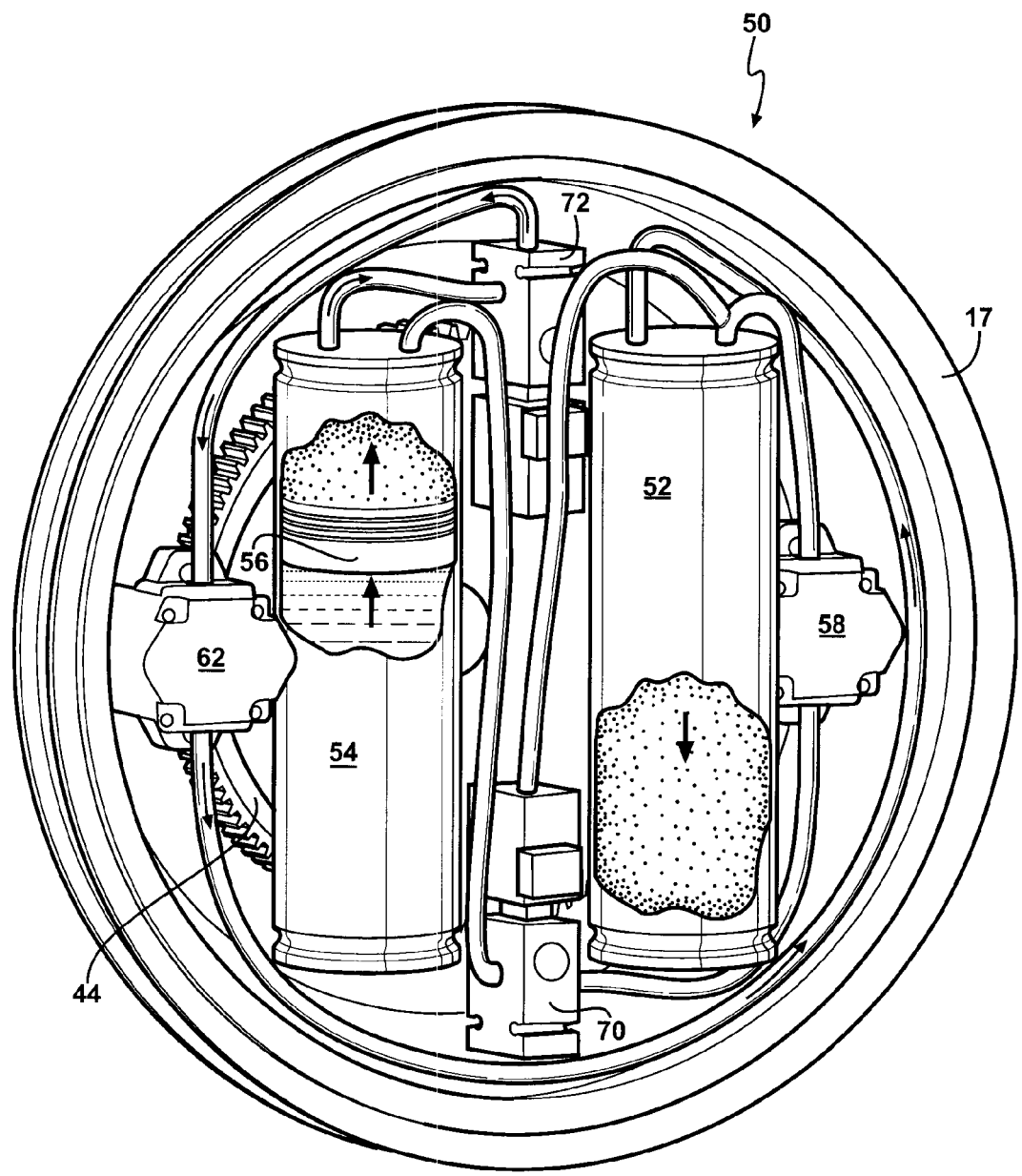
FIG. 12 shows the components of the subject two-stage hydraulic regenerative braking system as shown in FIG. 10 presented in an accelerating mode of the braking system.

As illustrated in FIGS. 11 and 12, a piston 56 is disposed in the second housing 54 for separating the second fluid from the first fluid transferred to the second housing 54 from the first housing 52 in a braking mode, shown by solid arrows in FIG. 11. The piston 56 is not intended to limit the scope of the present invention. Other devices, such as a membrane (not illustrated), a bladder (not illustrated), or a spring (not illustrated) cooperable with the piston 56 and extending from the bottom of the second housing 54 may be utilized as the biasing mechanism without limiting the scope of the present invention. A pump 58 is connected to the first housing 52. Preferably, the pump 58 is a hydraulic pump as known to those skilled in a mechanical art. The pump 58 includes and is clutched a first secondary pinion gear 60 meshingly engaging the ring gear 44 thereby activating the pump 58 as the front wheel 14' rotates about the front axle 21. The pump 58 may optionally include an electric assisting mechanism built there into. A motor 62 is connected to the second housing 54 and meshingly engaged with the ring gear 44 through a second secondary gear 64 extending from the motor 62. Preferably, the motor 62 is a hydraulic motor as known to those skilled in a mechanical art. The motor 62 is activated in the accelerating mode as the braking energy, i.e. the first fluid is biased out of the second housing 54 by the piston thereby forcing the motor 62 to rotate the ring gear 44 about the front axle 21, shown by solid arrows in FIG. 12. A first valve 70 and a second valve 72 fluidly communicate with the first and second housings 52 and 54 and the pump 58 and the motor 62. The first and second valves 70 and 72 are manually or electrically activated by the rider to regulate the braking mode and the accelerating mode of the braking mechanism 50. Preferably, the first and second valves 70 and 72 are two-way valves or three-way valves without limiting the scope of the present invention alternatively, all or at least one of the aforementioned A fluid communication system, generally shown at 80 in FIGS. 10 through 12, is used to operably circulate the first fluid between the first valve 70, the second valve 72, the first and second housings 52 and 54, the pump 58, and the motor 62. A first line 82 of the system 80 extends from the first housing 52 through the pump 58 and to the first valve 70 for delivering the first fluid to the first valve 70. A second line 84 extends from the first valve 70 to the second housing 54 for injecting the first fluid to the second housing 54 thereby biasing the piston to compress the second fluid inside the second housing 54. A third line 86 extends from the second housing 54 to the second valve 72 for delivering the first fluid back to the second valve 72 as the first fluid is biased out from the second housing 54 by the piston 56 in the accelerating mode. A fourth line 88 extends from the second valve 72 to the motor 62 thereby activating the motor 62 in the accelerating mode. A fifth line 90 extends from the motor 62 back to the first housing 54 for delivering the first fluid back to the first housing 52 before the first fluid is re-circulated back to the pump 58 through the first line 82. A circulation line 92 fluidly communicates with the first line 82 and the first valve 70 to deliver the first fluid back to the first line 82. The aforementioned lines 82, 84, 86, 88, 90, and 92 are formed from a metal or polymeric material without limiting the scope of the present invention.

Figure 9:
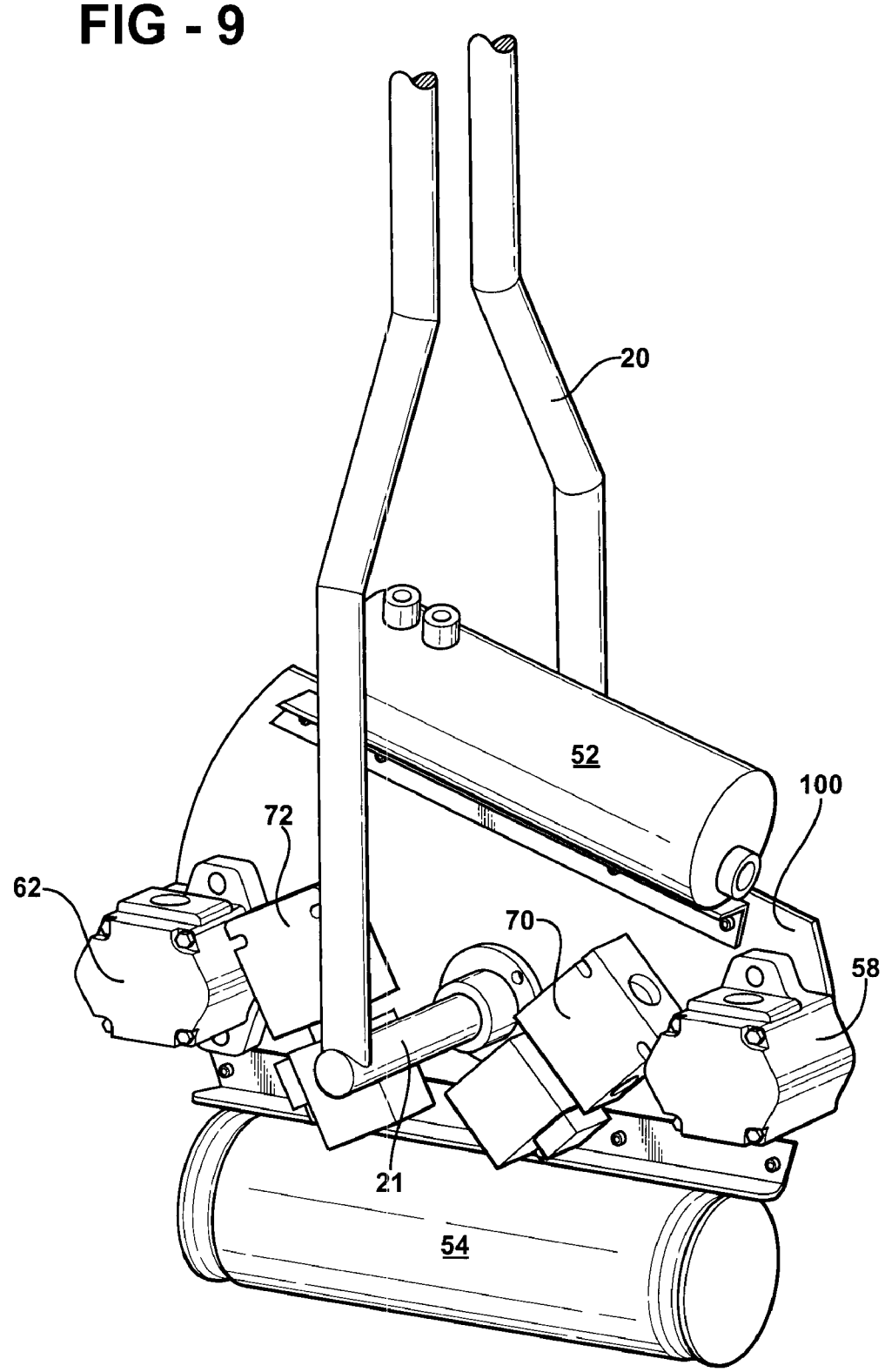
FIG. 9 illustrates a perspective view of an axle with an alternative layout of the components of the subject two-stage hydraulic regenerative braking system connected to a bracket rigidly connected to the axle.

As best shown in FIG. 9, a support bracket 100 is rigidly connected to the first and second housings 52 and 54, the first and second valves 70 and 72, the motor 62 and the pump 58. The support bracket 100 is rigidly connected to the front axle as the rim 17 rotates relative the front axle 21.

Specifically, and referring to FIGS. 13 through 16, the hydraulic circuitry includes a high-pressure line and a low-pressure line to be described in greater details. The two-way valves 70, 72 may be manually actuated, but in the preferred embodiment the two-way valves 70, 72 are shifted by electric solenoid valves, depicted generically as actuators 102, 104 respectively. The actuators 102, 104 are controlled through a switch 106 represented for illustrative purposes as a 4-position switch, but in practice can take any known form. Preferably, the switch 106 is mounted on the handlebar 19 or in some other convenient location. The switch 106 is shown including 4 positions, or modes, which for descriptive purposes only, have been labeled: IDLE, LITE REGENeration, MAX REGENeration and LAUNCH.

Figure 13:
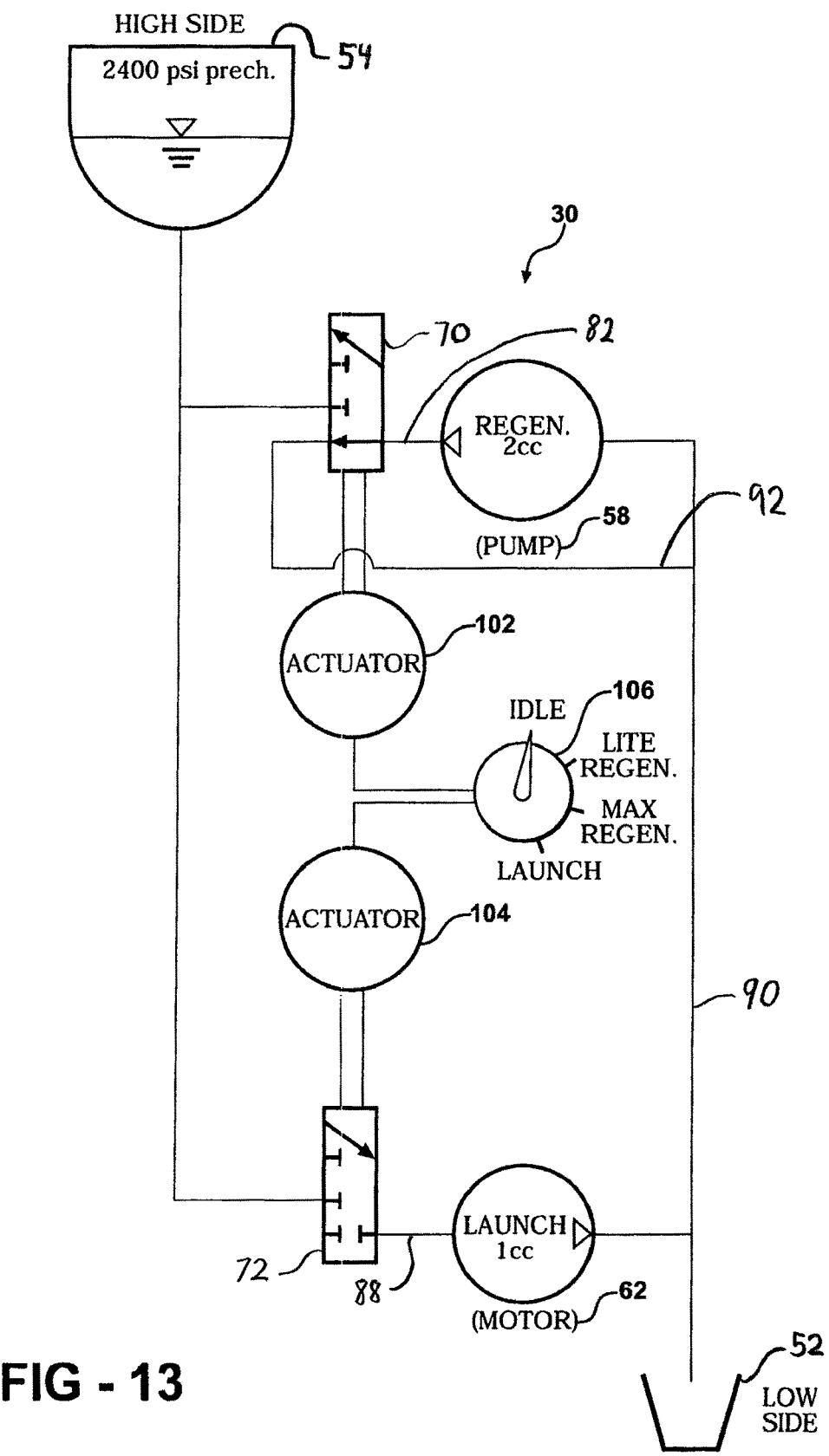
FIG. 13 is a schematic view of the subject invention showing the hydraulic system in idle mode.

In the IDLE mode of in FIG. 13, the switch 106 energizes each of the actuators 102, 104 to shift their respective 2-way valves 70, 72 to the positions shown. The pump switch 44 directs the discharge from the pump 58 to the pump recirculation line 82 which simply re-circulates back to the intake of the pump 58 through the line 92. Similarly, the motor actuator 104 shifts its two-way valve 72 to a position in which the inlet to the motor 62 connects with the motor recirculation line 88. In this IDLE mode of FIG. 13, the high side accumulator 54 is stopped from interacting with either of the pump 58 and the motor 62 by way of the valves 70, 72.

Figure 14:
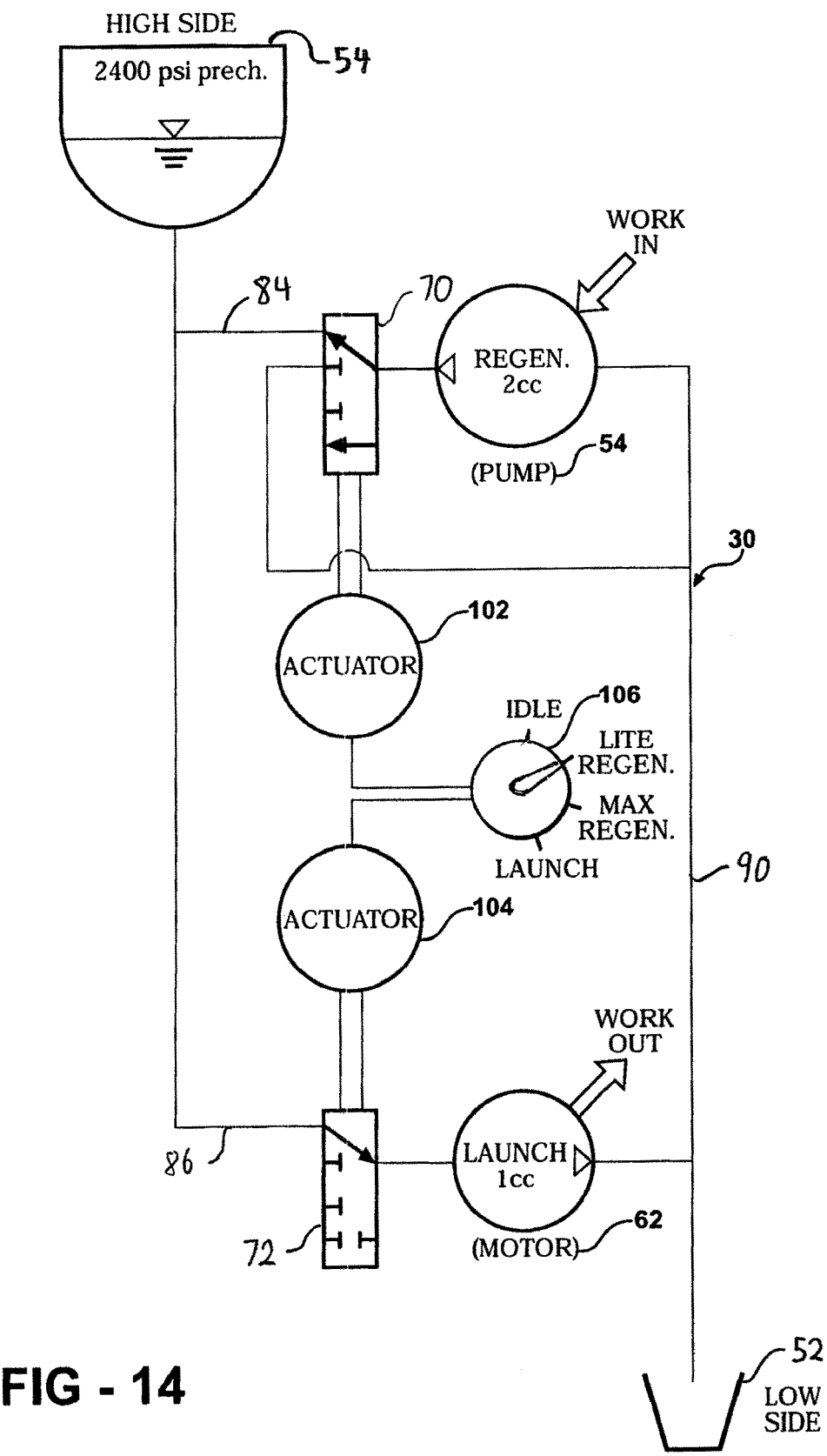
FIG. 14 is a schematic view as in FIG. 13 but showing the hydraulic system in a light regeneration mode.

FIG. 14' depicts the LITE REGENeration mode of the system 30, wherein both the pump 58 and the motor 62 interact with the high side accumulator 54. This is accomplished by moving each of the valves 70, 72 to the positions shown. Here, the pump 58 receives work, or regeneration energy, via its pinion or secondary gear 62 interacting with the ring gear 44 and thereby forcibly driving the first or hydraulic fluid into the high side accumulator or the second housing 54. At the same time, the high side accumulator or the second housing 54 is open to the inlet side of the motor 62, thereby extracting energy from the pressurized hydraulic fluid via its second pinion or secondary gear 64 meshing with the ring gear 44. The net result during this LITE REGENeration mode is that the bicycle slows due to the conversion of its kinetic energy into stored energy inside the accumulator 54.

In the preferred embodiment, the pump 58 has a larger displacement capacity than the motor 62, for example a 2:1 ratio whereby the pump 58 has twice the displacement capacity of the motor 62. The result of this configuration is that hydraulic fluid pumped by the pump 58 enters the high-pressure line 82, and hence the accumulator 54, at twice the rate (for example) at which hydraulic pressure is withdrawn through the motor 62 and placed in the low-pressure line. The effect is that only half of the regenerative energy of the system 30 is used during regenerative braking. This LITE REGENeration mode may be advisable in situations where the rider does not wish to decelerate rapidly, or in conditions where the riding surface is unstable and might not provide the friction surface necessary for MAX REGENeration.

Figure 15:
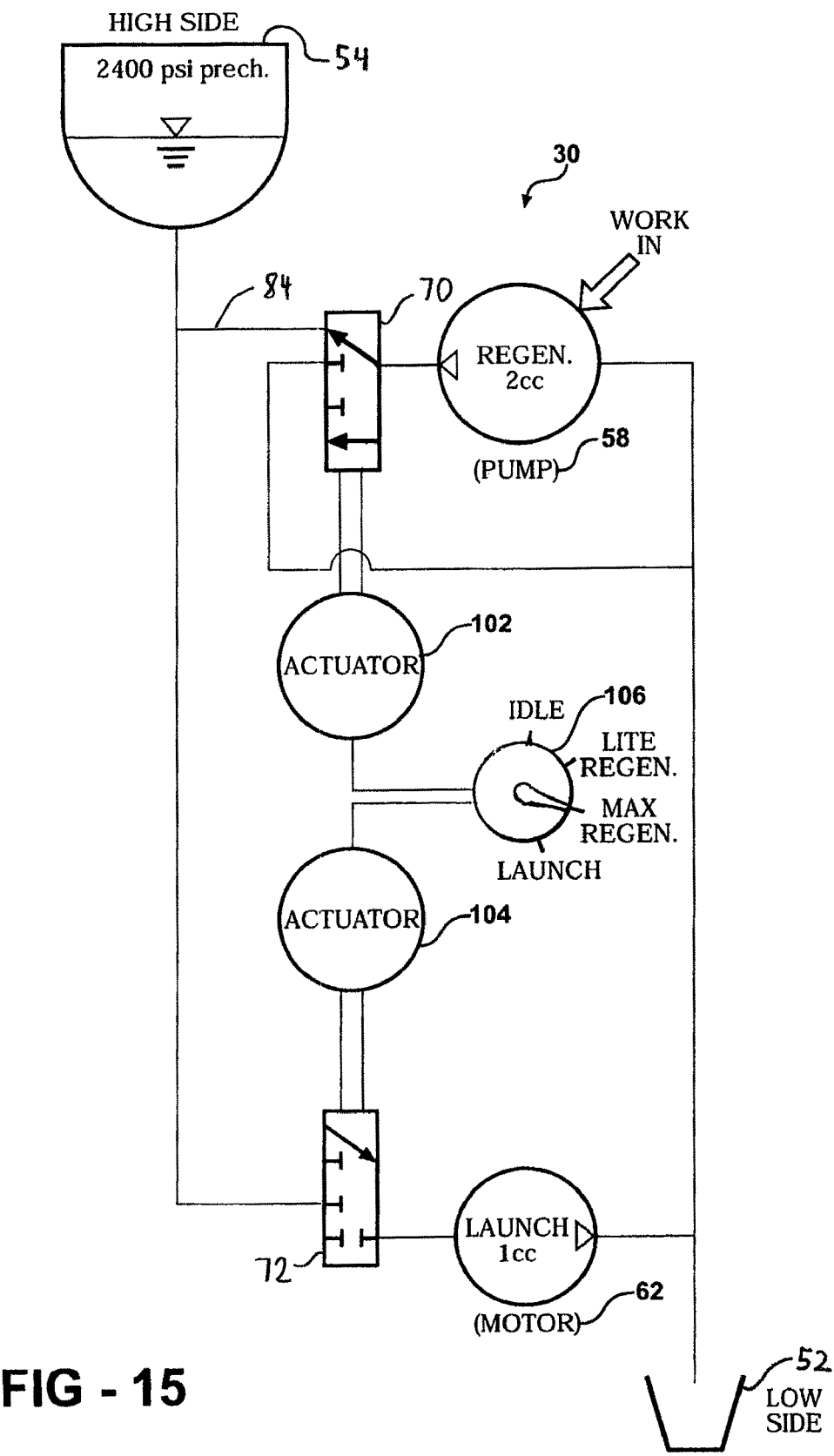
FIG. 15 is a schematic view as in FIG. 13 but showing the hydraulic system in a maximum regeneration mode.
Figure 16:
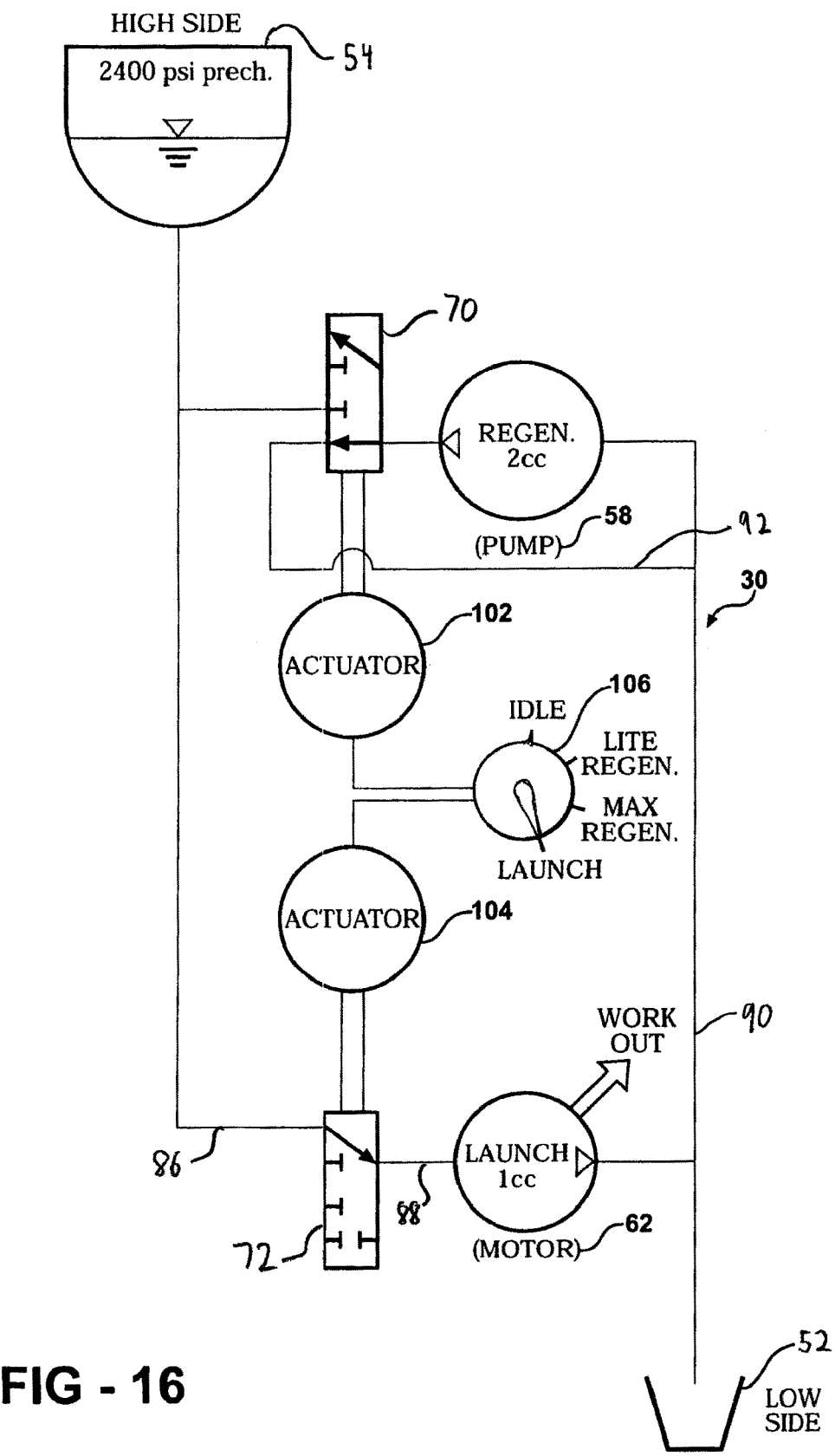
FIG. 16 is a schematic view as in FIG. 13 but showing the hydraulic system in a launch mode.

FIG. 15 depicts the hydraulic system in a MAXimum REGENeration mode wherein the switch 106 is manipulated and thereby controls the actuators 102, 104 to move the motor valve 72 to a recirculation condition. In this state, the pump valve 70 is open and allows discharge from the pump 58 to rapidly charge the high side accumulator 54. Thus, only the pump 58 is contributing in this mode, with hydraulic fluid being withdrawn from the low side reservoir 52 and used to fill the high side accumulator 54. The high side accumulator 54 includes a diaphragm against which the back side is pre-charged with high pressure gas, for example on the order of 2,400 psi. As the pump 58 fills the hydraulic side of the diaphragm, the pressure inside the accumulator 54 can increase to a design maximum, for example 4,000 psi. Thus, 1,600 psi is stored in the gas as available potential energy. If a level of regenerative braking is desired somewhere between the LITE REGENeration and MAXimum REGENeration modes, the motor actuator 102 can be cycled between the two positions so that the motor 62 is intermittently energized, thereby diminishing the maximum regeneration braking capacity by the capacity ratio between the pump 58 and the motor 62, suggested as 2:1 in the preceding example. Thus, the switch 106 can be fitted with a variable control (not shown) which can infinitely adjust the duty cycle for the motor actuator to achieve a selectable regenerative braking result. As but one example, the actuator 102 cycle speed may be configured at 5 Hertz. By setting the cycle time for 0.1 seconds "ON" and 0.1 seconds "OFF", a 50% Duty Cycle may be achieved, resulting in a regenerative braking action half-way between LITE REGENeration and MAX REGENeration. By manipulating this Duty Cycle, the level of regenerative braking can be adjusted to suit the situation. In practice, it may be necessary to incorporate an anti-cavitation mechanism in the motor 62 to best implement a Duty Cycle feature.

Once the maximum amount of energy has been stored in the accumulator 102, it can be released in a controlled manner to assist in LAUNCH, or acceleration, of the bicycle 10. This is accomplished by moving the switch 106 to the LAUNCH position. Here, the pump valve 70 is closed, thereby placing the pump 58 in recirculation mode, whereas the motor valve 72 is opened to allow pressurized hydraulic fluid in the accumulator 54 to enter the inlet side of the motor 62. This results in a conversion of the stored energy into rotation of the second pinion 64, which in turn drives the ring gear 44 and spins the wheel assembly 17. This condition can be maintained until all of the excess pressure (i.e., above the pre-charges) in the accumulator 102 has been depleted, or until such time as the rider changes the mode of the switch 106.

Alluding to the above, the switch 106 is generally mounted in a convenient location, which can be a relatively simple task for a skilled bicycle mechanic. The subject invention is also unique in that it can be used to accomplish variable braking responses through the use of fixed displacement motor/pumps. This can be implemented to achieve traction control ability akin to anti-lock braking systems found in automobiles.

The present inventive concept may be utilized by other applications, such as for example in a transmission for hydraulic hybrid vehicles, wherein power to wheels is transmitted through a drive shaft (none of the components are illustrated). At least two hydraulic pumps are configured to apply continuously variable braking and launching force to the drive axel, without interrupting the flow of power through the axel. When braking, which employs three primary levels of regenerative braking, the first pump and the second pump are operably engaged. Alternatively, the first is engaged with the second pump being idle, or the second pump is engaged with the first pump being idle. A center gear (not shown) is gradually stopped by a first brake to give continually variable braking. Full hydraulic regenerative braking is engaged when the center gear is locked in place. A second brake is applied in combination with the first brake to instantly brake the vehicle with no hydraulic regeneration. When launching, the first pump releases fluid pressure from the high side to give launching force. For full launching the second pump idles fluid. For partial launching the second pump puts fluid back into high-pressure accumulator (the first pump displaces more fluid than the second pump). The center gear is gradually stopped by the first brake to give continually variable launching. Full hydraulic launching is engaged when the center gear is locked in place. When idling the second pump is locked in place directly by the second brake. The first pump is locked in place indirectly by the second brake. Both large gears much turn at the same velocity due to the meshing engagement of the gears.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A regenerative braking wheel assembly for a vehicle comprising:
   a radially outer circular wheel rim configured for rotational motion about a transverse axle, defining a radially inner space from the circular wheel rim to the transverse axle, wherein the radially inner space further includes:
   a ring gear mounted on the transverse axle and configured for unitary rotational motion with the rim within the radially inner space;
   a support frame;
   a first storage tank and a second storage tank mounted on the support frame and in fluid communication with one another through one or more fluid lines;
   a pump connected with the support frame and operatively associated with the one or more fluid lines, the pump being configured for facilitating movement of a fluid between the first and second storage tanks;
   a first pinion gear operatively associated with the pump and engaged with the ring gear, wherein rotation of the ring gear transmits rotational motion to the first pinion gear and rotational motion of the first pinion gear operates the pump;
   a motor connected with the support frame and in fluid communication with the one or more fluid lines such that movement of the fluid in the one or more fluid lines operates the motor; and
   a second pinion gear operatively associated with the motor and engaged with the ring gear for transmitting rotational motion thereto, wherein operation of the motor causes the rotation of the second pinion gear,
   wherein movement of fluid in the fluid lines is at least partially responsive to a selected mode of operation and the mode of operation includes:
   a braking mode, wherein a fluid in the one or more fluid storage tanks is pressurized by the rotational motion of the circular rim in association with the ring gear, the first pinion gear and the operation of the pump;
   an idle mode, wherein pressure of the fluid in the one or more fluid storage tanks is maintained at a substantially constant value independent of the rotational motion of the circular rim; and
   and an accelerating mode, wherein the rotational motion of the circular rim is responsive to the depressurization of the pressurized fluid in the fluid storage tanks in association with the ring gear, the second pinion gear and the operation of the motor, the second pinion gear and the ring gear.

2. A regenerative braking wheel assembly as set forth in claim 1, further comprising a remote actuator for selecting the mode of operation.

3. A regenerative braking wheel assembly as set forth in claim 1, wherein the support frame is secured on the transverse axle for rotational motion.

4. A regenerative braking wheel assembly as set forth in claim 1, wherein the support frame includes an opening for receiving the transverse axle therein.

5. A regenerative braking wheel assembly as set forth in claim 1, wherein the support frame is secured to the circular wheel rim.

6. A regenerative braking wheel assembly as set forth in claim 1, further comprising a pair of side covers engaged to the rim which substantially enclose the radially inner space defined by the rim.

7. A regenerative braking wheel assembly as set forth in claim 6, wherein the support frame is secured to at least one of the side covers.

8. A regenerative braking wheel assembly as set forth in claim 6, wherein the ring gear is secured to at least one of the side covers.

9. A regenerative braking wheel assembly a set forth in claim 1, wherein the second fluid tank includes a moveable piston defining a compressible volume within the second fluid tank between the piston and bottom of the second fluid tank, wherein a first fluid is disposed in the compressible volume and the fluid comprises a second fluid is disposed in the remaining portion of the second fluid tank, the one or more fluid lines and the first fluid tank.

10. A regenerative braking wheel assembly for a vehicle comprising:
a single, radially outer circular wheel rim configured for rotational motion about a transverse axle, wherein the circular wheel rim defines a radially inner space from the circular wheel rim to the transverse axle;
a radially inner support frame positioned within the radially inner space defined by the circular wheel rim;
one or more fluid storage tanks mounted on the support frame comprising a first storage tank and a second storage tank in fluid communication with one another through one or more fluid lines, movement of the fluid therein being at least partially responsive to the selected mode of operation;
a pump mounted on the support frame and operatively associated with the one or more fluid lines, the pump being configured for facilitating movement of the fluid between the first and second storage tanks;
a radially inner ring gear mounted on the transverse axle and configured for unitary rotational motion with the rim, and a first pinion gear operatively associated with the pump and engaged with the ring gear, wherein rotation of the ring gear transmits rotational motion to the first pinion gear and rotational motion of the first pinion gear operates the pump; and
a radially inner braking mechanism including an engagement with the circular rim configured for permitting the transfer rotational motion between the braking mechanism and circular rim, the braking mechanism and engagement being positioned within the radially inner space defined by the circular wheel rim, the braking mechanism being operatively associated with the one or more fluid storage tanks and the circular rim and configured for being selectively operable in one of the following modes:
a braking mode, wherein a fluid in the one or more fluid storage tanks is pressurized by providing resistance to rotational motion of the circular rim;
an idle mode, wherein pressure of the fluid in the one or more fluid storage tanks is maintained at a substantially constant value independent of the rotational motion of the circular rim; and
and an accelerating mode, wherein the rotational motion of the circular rim is responsive to the depressurization of the pressurized fluid in the one or more fluid storage tanks.

11. A regenerative braking wheel assembly as set forth in claim 10, wherein the second fluid tank includes a moveable piston defining a compressible volume within the second fluid tank between the piston and bottom of the second fluid tank, wherein a first fluid is disposed in the compressible volume and a second fluid is disposed in the remaining portion of the second fluid tank, the one or more fluid lines and the first fluid tank.

12. A regenerative braking wheel assembly as set forth in claim 11, further comprising a motor mounted on the support frame and in fluid communication with the one or more fluid lines such that movement of the second fluid in the one or more fluid lines operates the motor, and a second pinion gear operatively associated with the motor and engaged with the ring gear for transmitting rotational motion thereto, wherein operation of the motor causes the rotation of the second pinion gear.

13. A regenerative braking wheel assembly as set forth in claim 12 wherein the first fluid is compressed by the movement of the piston in the second fluid tank responsive to the operation of the pump in the braking mode, and the movement of the second fluid in through the one or more fluid lines operates the motor to cause the rotation of the second pinion gear in the accelerating mode.

14. A regenerative braking wheel assembly as set forth in claim 10, further comprising one or more bowl-shaped side covers engaged to the rim which substantially enclose the radially inner space defined by the circular wheel rim.

15. A regenerative braking wheel assembly as set forth in claim 14, herein the support frame is secured to the one or more side covers.

16. A regenerative braking wheel assembly as set forth in claim 14, wherein the radially inner braking mechanism includes a ring gear secured to the one or more side covers.

17. A regenerative braking wheel assembly as set forth in claim 10, further comprising a remote actuator in communication with the braking mechanism and configured for selecting the mode of operation.

18. A regenerative braking wheel assembly as set forth in claim 10, wherein the braking mode and the accelerating mode each comprise a plurality of braking and accelerating modes of varying degree.

19. A regenerative braking wheel assembly as set forth in claim 10, wherein the circular wheel rim further comprises a radially outer tire engaged thereto.

20. A regenerative braking wheel assembly as set forth in claim 10 wherein said vehicle is further defined by a bicycle having a frame and another axle spaced from said axle and a second wheel spaced from said at least one wheel and a steering bar.

21. A regenerative braking wheel assembly as set forth in claim 20, further comprising a brake actuator connected to said steering bar and presenting operative communication with said braking mechanism.

22. A regenerative braking wheel assembly as set forth in claim 10 wherein said vehicle is a motorized vehicle.

* * * * *